US009128554B2

(12) United States Patent
Fredriksen

(10) Patent No.: US 9,128,554 B2
(45) Date of Patent: Sep. 8, 2015

(54) CHAINED DIFFERENTIAL SENSING FOR TOUCH SENSORS

(71) Applicant: Einar Fredriksen, Trondheim (NO)

(72) Inventor: Einar Fredriksen, Trondheim (NO)

(73) Assignee: Atmel Corporation, San Jose, CA (US)

( * ) Notice: Subject to any disclaimer, the term of this patent is extended or adjusted under 35 U.S.C. 154(b) by 64 days.

(21) Appl. No.: 14/015,140

(22) Filed: Aug. 30, 2013

(65) Prior Publication Data

US 2015/0062019 A1    Mar. 5, 2015

(51) Int. Cl.
*G06F 3/041*    (2006.01)

(52) U.S. Cl.
CPC ..................... *G06F 3/041* (2013.01)

(58) Field of Classification Search
CPC ... G06F 3/03547; G06F 3/041; G06F 3/0412; G06F 3/0414; G06F 3/046; G06F 3/047; G06F 2203/041
USPC ...................... 345/173–178; 178/18.01–18.09
See application file for complete search history.

(56) References Cited

U.S. PATENT DOCUMENTS

| 7,663,607 | B2 | 2/2010 | Hotelling |
| 7,875,814 | B2 | 1/2011 | Chen |
| 7,920,129 | B2 | 4/2011 | Hotelling |
| 8,031,094 | B2 | 10/2011 | Hotelling |
| 8,031,174 | B2 | 10/2011 | Hamblin |
| 8,040,326 | B2 | 10/2011 | Hotelling |
| 8,049,732 | B2 | 11/2011 | Hotelling |
| 8,179,381 | B2 | 5/2012 | Frey |
| 2009/0315854 | A1 | 12/2009 | Matsuo |
| 2012/0242588 | A1 | 9/2012 | Myers |
| 2012/0242592 | A1 | 9/2012 | Rothkopf |
| 2012/0243151 | A1 | 9/2012 | Lynch |
| 2012/0243719 | A1 | 9/2012 | Franklin |
| 2013/0076612 | A1 | 3/2013 | Myers |
| 2013/0285972 | A1* | 10/2013 | Elias et al. ............... 345/174 |

FOREIGN PATENT DOCUMENTS

WO    WO 2012/129247    9/2012

OTHER PUBLICATIONS

U.S. Appl. No. 61/454,936, filed Mar. 21, 2011, Myers.
U.S. Appl. No. 61/454,950, filed Mar. 21, 2011, Lynch.
U.S. Appl. No. 61/454,894, filed Mar. 21, 2011, Rothkopf.

* cited by examiner

*Primary Examiner* — Premal Patel
(74) *Attorney, Agent, or Firm* — Baker Botts L.L.P.

(57) ABSTRACT

In one embodiment, a method includes measuring two or more output signals, calculating a plurality of reconstructed values, and determining a position of an object relative to a touch sensor based at least on the plurality of reconstructed values. Each output signal is associated with one of two or more differential integrators. Each differential integrator includes first and second inputs connected to respective electrode tracks of the touch sensor and an output configured to generate the output signal proportional to a difference between signals received at the first and second inputs. The differential integrators are chained such that each electrode track is associated with a previous electrode track connected to the first input of the differential integrator whose second input is connected to the electrode track and a next electrode track connected to the second input of the differential integrator whose first input is electrically connected to the electrode track.

20 Claims, 6 Drawing Sheets

CHAINED DIFFERENTIAL SENSING FOR TOUCH SENSORS

TECHNICAL FIELD

This disclosure relates generally to touch sensor technology and, more particular, to chained differential sensing for touch sensors.

BACKGROUND

A touch sensor may detect the presence and location of a touch or the proximity of an object (such as a user's finger or a stylus) within a touch-sensitive area of the touch sensor overlaid on a display screen, for example. In a touch-sensitive-display application, the touch sensor may enable a user to interact directly with what is displayed on the screen, rather than indirectly with a mouse or touch pad. A touch sensor may be attached to or provided as part of a desktop computer, laptop computer, tablet computer, personal digital assistant (PDA), Smartphone, satellite navigation device, portable media player, portable game console, kiosk computer, point-of-sale device, or other suitable device. A control panel on a household or other appliance may include a touch sensor.

There are a number of different types of touch sensors, such as (for example) resistive touch screens, surface acoustic wave touch screens, and capacitive touch screens. Herein, reference to a touch sensor may encompass a touch screen, and vice versa, in particular embodiments. When an object touches or comes within proximity of the surface of the capacitive touch screen, a change in capacitance may occur within the touch screen at the location of the touch or proximity. A controller may process the change in capacitance to determine its position on the touch screen.

DESCRIPTION OF EXAMPLE EMBODIMENTS

Figure 1:
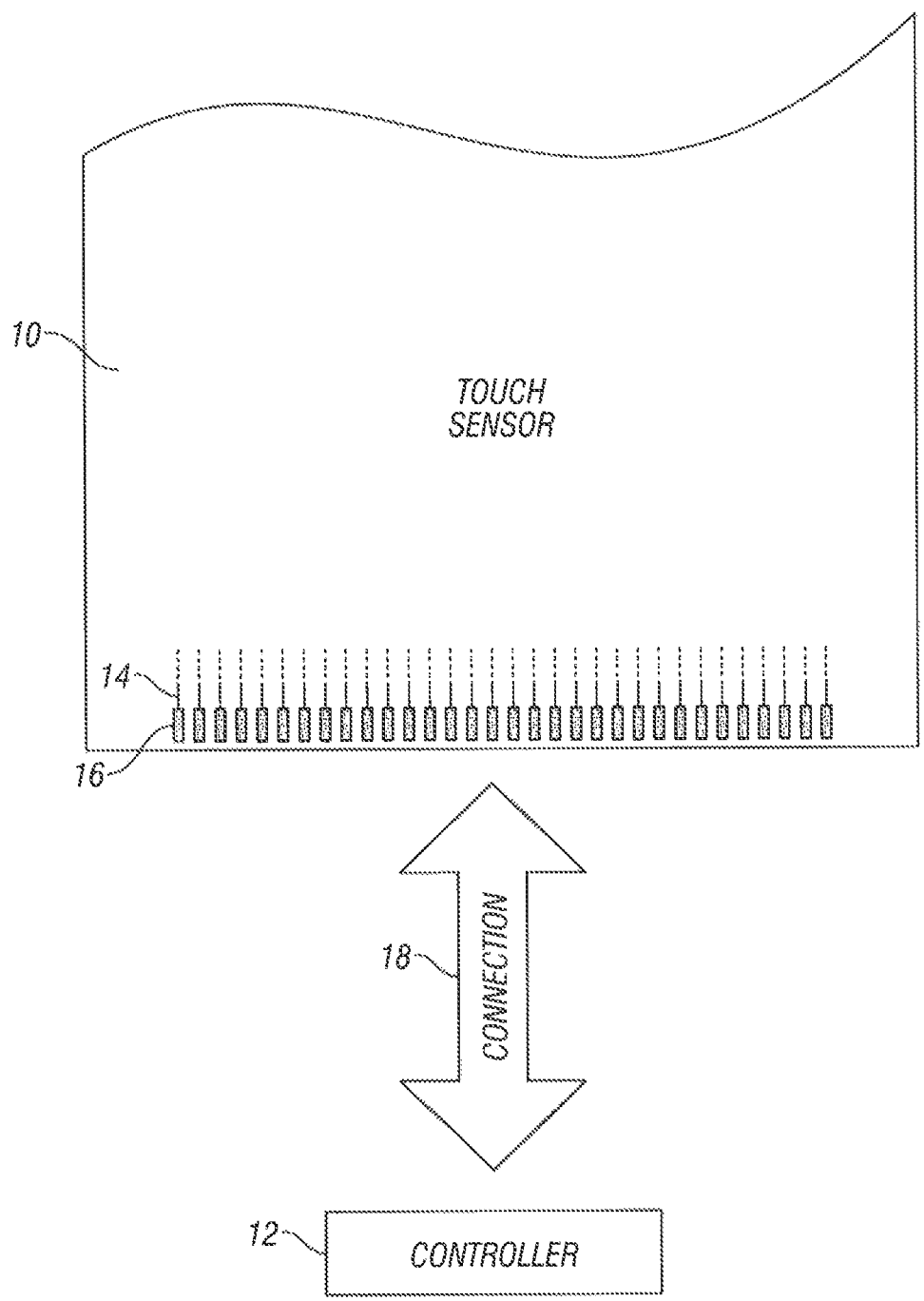
FIG. 1 illustrates an example touch sensor and controller.

FIG. 1 illustrates an example touch sensor 10 with an example controller 12. Touch sensor 10 and controller 12 may detect the presence and location of a touch or the proximity of an object within a touch-sensitive area of touch sensor 10. Herein, reference to a touch sensor may encompass both the touch sensor and its controller, in particular embodiments. Similarly, reference to a controller may encompass both the controller and its touch sensor, in particular embodiments.

Touch sensor 10 may include one or more touch-sensitive areas, in particular embodiments. Touch sensor 10 may include an array of drive and sense electrodes (or an array of electrodes of a single type) disposed on one or more substrates, which may be made of a dielectric material. Herein, reference to a touch sensor may encompass both the electrodes of the touch sensor and the substrate(s) that they are disposed on, in particular embodiments. Alternatively, in particular embodiments, reference to a touch sensor may encompass the electrodes of the touch sensor, but not the substrate(s) that they are disposed on.

An electrode (whether a ground electrode, a guard electrode, a drive electrode, or a sense electrode) may be an area of conductive material forming a shape, such as for example a disc, square, rectangle, thin line, other suitable shape, or suitable combination of these. One or more cuts in one or more layers of conductive material may (at least in part) create the shape of an electrode, and the area of the shape may (at least in part) be bounded by those cuts. In particular embodiments, the conductive material of an electrode may occupy approximately 100% of the area of its shape. As an example and not by way of limitation, an electrode may be made of indium tin oxide (ITO) and the ITO of the electrode may occupy approximately 100% of the area of its shape (sometimes referred to as 100% fill), in particular embodiments. In particular embodiments, the conductive material of an electrode may occupy substantially less than 100% of the area of its shape. As an example and not by way of limitation, an electrode may be made of fine lines of metal or other conductive material (FLM), such as for example copper, silver, or a copper- or silver-based material; and the fine lines of conductive material may occupy approximately 5% of the area of its shape in a hatched, mesh, or other suitable pattern. Herein, reference to FLM may encompass such material, in particular embodiments. Although this disclosure describes or illustrates particular electrodes made of particular conductive material forming particular shapes with particular fill percentages having particular patterns, this disclosure contemplates any suitable electrodes made of any suitable conductive material forming any suitable shapes with any suitable fill percentages having any suitable patterns.

In particular embodiments, the shapes of the electrodes (or other elements) of a touch sensor may constitute in whole or in part one or more macro-features of the touch sensor. One or more characteristics of the implementation of those shapes (such as, for example, the conductive materials, fills, or patterns within the shapes) may constitute in whole or in part one or more micro-features of the touch sensor. One or more macro-features of a touch sensor may determine one or more characteristics of its functionality, and one or more micro-features of the touch sensor may determine one or more optical features of the touch sensor, such as transmittance, refraction, or reflection.

A mechanical stack may contain the substrate (or multiple substrates) and the conductive material forming the drive or sense electrodes of touch sensor 10. As an example and not by way of limitation, the mechanical stack may include a first layer of optically clear adhesive (OCA) beneath a cover panel. The cover panel may be clear and made of a resilient material suitable for repeated touching, such as for example glass, polycarbonate, or poly(methyl methacrylate) (PMMA). This disclosure contemplates any suitable cover panel made of any suitable material. The first layer of OCA may be disposed between the cover panel and the substrate with the conductive material forming the drive or sense electrodes. The mechanical stack may also include a second layer of OCA and a dielectric layer (which may be made of PET or another suitable material, similar to the substrate with the conductive material forming the drive or sense electrodes). As an alternative, in particular embodiments, a thin coating of a dielectric material may be applied instead of the second layer of OCA and the dielectric layer. The second layer of OCA may be disposed between the substrate with the conductive material making up the drive or sense electrodes and the dielectric layer, and the dielectric layer may be disposed between the second layer of OCA and an air gap to a display of a device including touch sensor 10 and controller 12. As an example only and not by way of limitation, the cover panel may have a thickness of approximately 1 mm; the first layer of OCA may have a thickness of approximately 0.05 mm; the substrate with the conductive material forming the drive or sense electrodes may have a thickness of approximately 0.05 mm; the second layer of OCA may have a thickness of approximately 0.05 mm; and the dielectric layer may have a thickness of approximately 0.05 mm. Although this disclosure describes a particular mechanical stack with a particular number of particular layers made of particular materials and having particular thicknesses, this disclosure contemplates any suitable mechanical stack with any suitable number of any suitable layers made of any suitable materials and having any suitable thicknesses. As an example and not by way of limitation, in particular embodiments, a layer of adhesive or dielectric may replace the dielectric layer, second layer of OCA, and air gap described above, with there being no air gap to the display.

One or more portions of the substrate of touch sensor 10 may be made of polyethylene terephthalate (PET) or another suitable material. This disclosure contemplates any suitable substrate with any suitable portions made of any suitable material. In particular embodiments, the drive or sense electrodes in touch sensor 10 may be made of ITO in whole or in part. In particular embodiments, the drive or sense electrodes in touch sensor 10 may be made of fine lines of metal or other conductive material. As an example and not by way of limitation, one or more portions of the conductive material may be copper or copper-based and have a thickness of approximately 5 µm or less and a width of approximately 10 µm or less. As another example, one or more portions of the conductive material may be silver or silver-based and similarly have a thickness of approximately 5 µm or less and a width of approximately 10 µm or less. This disclosure contemplates any suitable electrodes made of any suitable material.

As used herein, a capacitive node refers to a portion of touch sensor 10 that is configured to provide a distinct capacitive measurement. In various embodiments, capacitive nodes may have different sizes, shapes, and/or configurations. Furthermore, in some embodiments, the size, shape, and other aspects of a capacitive node may be determined by the configuration of controller 12 and may be changed dynamically during the operation of device 2. For example, in some embodiments, multiple tracks 14 may be galvanically connected and sensed together, resulting in a capacitive node spanning multiple electrodes.

Touch sensor 10 may implement a capacitive form of touch sensing. In a mutual-capacitance implementation, touch sensor 10 may include an array of drive and sense electrodes forming an array of capacitive nodes. A drive electrode and a sense electrode may form a capacitive node. The drive and sense electrodes forming the capacitive node may come near each other, but not make electrical contact with each other. Instead, the drive and sense electrodes may be capacitively coupled to each other across a space between them. A pulsed or alternating voltage applied to the drive electrode (by controller 12) may induce a charge on the sense electrode, and the amount of charge induced may be susceptible to external influence (such as a touch or the proximity of an object). When an object touches or comes within proximity of the capacitive node, a change in capacitance may occur at the capacitive node and controller 12 may measure the change in capacitance. By measuring changes in capacitance throughout the array, controller 12 may determine the position of the touch or proximity within the touch-sensitive area(s) of touch sensor 10.

In a self-capacitance implementation, touch sensor 10 may include an array of electrodes of a single type that may each form a capacitive node. When an object touches or comes within proximity of the capacitive node, a change in self-capacitance may occur at the capacitive node and controller 12 may measure the change in capacitance, for example, as a change in the amount of charge needed to raise the voltage at the capacitive node by a pre-determined amount. As with a mutual-capacitance implementation, by measuring changes in capacitance throughout the array, controller 12 may determine the position of the touch or proximity within the touch-sensitive area(s) of touch sensor 10. This disclosure contemplates any suitable form of capacitive touch sensing, in particular embodiments.

In particular embodiments, one or more drive electrodes may together form a drive line running horizontally or vertically or in any suitable orientation. Similarly, one or more sense electrodes may together form a sense line running horizontally or vertically or in any suitable orientation. In particular embodiments, drive lines may run substantially perpendicular to sense lines. Herein, reference to a drive line may encompass one or more drive electrodes making up the drive line, and vice versa, in particular embodiments. Similarly, reference to a sense line may encompass one or more sense electrodes making up the sense line, and vice versa, in particular embodiments.

Touch sensor 10 may have drive and sense electrodes disposed in a pattern on one side of a single substrate. In such a configuration, a pair of drive and sense electrodes capacitively coupled to each other across a space between them may form a capacitive node. For a self-capacitance implementation, electrodes of only a single type may be disposed in a pattern on a single substrate. In addition or as an alternative to having drive and sense electrodes disposed in a pattern on one side of a single substrate, touch sensor 10 may have drive electrodes disposed in a pattern on one side of a substrate and sense electrodes disposed in a pattern on another side of the substrate. Moreover, touch sensor 10 may have drive electrodes disposed in a pattern on one side of one substrate and sense electrodes disposed in a pattern on one side of another substrate. In such configurations, an intersection of a drive electrode and a sense electrode may form a capacitive node. Such an intersection may be a location where the drive electrode and the sense electrode "cross" or come nearest each other in their respective planes. The drive and sense electrodes do not make electrical contact with each other—instead they are capacitively coupled to each other across a dielectric at the intersection. Although this disclosure describes particular configurations of particular electrodes forming particular nodes, this disclosure contemplates any suitable configuration of any suitable electrodes forming any suitable nodes. Moreover, this disclosure contemplates any suitable electrodes disposed on any suitable number of any suitable substrates in any suitable patterns.

As described above, a change in capacitance at a capacitive node of touch sensor 10 may indicate a touch or proximity input at the position of the capacitive node. Controller 12 may detect and process the change in capacitance to determine the presence and location of the touch or proximity input. Controller 12 may then communicate information about the touch or proximity input to one or more other components (such one or more central processing units (CPUs)) of a device that includes touch sensor 10 and controller 12, which may respond to the touch or proximity input by initiating a function of the device (or an application running on the device). Although this disclosure describes a particular controller having particular functionality with respect to a particular device and a particular touch sensor, this disclosure contemplates any suitable controller having any suitable functionality with respect to any suitable device and any suitable touch sensor.

Controller 12 may be one or more integrated circuits (ICs), such as for example general-purpose microprocessors, microcontrollers, programmable logic devices or arrays, application-specific ICs (ASICs). In particular embodiments, controller 12 comprises analog circuitry, digital logic, and digital non-volatile memory. In particular embodiments, controller 12 is disposed on a flexible printed circuit (FPC) bonded to the substrate of touch sensor 10, as described below. The FPC may be active or passive, in particular embodiments. In particular embodiments, multiple controllers 12 are disposed on the FPC. Controller 12 may include a processor unit, a drive unit, a sense unit, and a storage unit. The drive unit may supply drive signals to the drive electrodes of touch sensor 10. The sense unit may sense charge at the capacitive nodes of touch sensor 10 and provide measurement signals to the processor unit representing capacitances at the capacitive nodes. The processor unit may control the supply of drive signals to the drive electrodes by the drive unit and process measurement signals from the sense unit to detect and process the presence and location of a touch or proximity input within the touch-sensitive area(s) of touch sensor 10. The processor unit may also track changes in the position of a touch or proximity input within the touch-sensitive area(s) of touch sensor 10. The storage unit may store programming for execution by the processor unit, including programming for controlling the drive unit to supply drive signals to the drive electrodes, programming for processing measurement signals from the sense unit, and other suitable programming, in particular embodiments. Although this disclosure describes a particular controller having a particular implementation with particular components, this disclosure contemplates any suitable controller having any suitable implementation with any suitable components.

Tracks 14 of conductive material disposed on the substrate of touch sensor 10 may couple the drive or sense electrodes of touch sensor 10 to connection pads 16, also disposed on the substrate of touch sensor 10. As described below, connection pads 16 facilitate coupling of tracks 14 to controller 12. Tracks 14 may extend into or around (e.g. at the edges of) the touch-sensitive area(s) of touch sensor 10. Particular tracks 14 may provide drive connections for coupling controller 12 to drive electrodes of touch sensor 10, through which the drive unit of controller 12 may supply drive signals to the drive electrodes. Other tracks 14 may provide sense connections for coupling controller 12 to sense electrodes of touch sensor 10, through which the sense unit of controller 12 may sense charge at the capacitive nodes of touch sensor 10. Tracks 14 may be made of fine lines of metal or other conductive material. As an example and not by way of limitation, the conductive material of tracks 14 may be copper or copper-based and have a width of approximately 100 μm or less. As another example, the conductive material of tracks 14 may be silver or silver-based and have a width of approximately 100 μm or less. In particular embodiments, tracks 14 may be made of ITO in whole or in part in addition or as an alternative to fine lines of metal or other conductive material. Although this disclosure describes particular tracks made of particular materials with particular widths, this disclosure contemplates any suitable tracks made of any suitable materials with any suitable widths. In addition to tracks 14, touch sensor 10 may include one or more ground lines terminating at a ground connector (which may be a connection pad 16) at an edge of the substrate of touch sensor 10 (similar to tracks 14).

Connection pads 16 may be located along one or more edges of the substrate, outside the touch-sensitive area(s) of touch sensor 10. As described above, controller 12 may be on an FPC. Connection pads 16 may be made of the same material as tracks 14 and may be bonded to the FPC using an anisotropic conductive film (ACF). Connection 18 may include conductive lines on the FPC coupling controller 12 to connection pads 16, in turn coupling controller 12 to tracks 14 and to the drive or sense electrodes of touch sensor 10. In another embodiment, connection pads 16 may be connected to an electro-mechanical connector (such as a zero insertion force wire-to-board connector); in this embodiment, connection 18 may not need to include an FPC. This disclosure contemplates any suitable connection 18 between controller 12 and touch sensor 10.

Touch sensor 10 may interact with a touch object such as an active stylus in any suitable manner. A particular active stylus may be configured to cause a change in capacitance at a capacitive node of touch sensor 10. The change in capacitance induced by the active stylus may mimic a touch by, for example, a human finger. Accordingly, when the processor causes the drive unit to supply drive signals to the one or more of the drive electrodes, an active stylus may detect the pulse and respond by injecting a charge at a capacitive node in proximity to the active stylus. The controller 12 may measure the change in capacitance to detect and/or track the location of the active stylus.

Certain embodiments of touch sensor 10 and controller 12 may measure capacitance or a change in capacitance using any suitable method. For example, voltage may be applied to one or more tracks 14 by opening or closing one or more switches associated with one or more tracks 14. Such switches may connect one or more tracks 14 to other portions of touch sensor 10 or controller 12 such as, for example, a voltage source (e.g. a voltage supply rail), a current source, or any other suitable component. Such methods may cause charge to be transferred to or from one or more portions of one or more tracks 14. In self-capacitance embodiments, the charged one or more tracks 14 may be sensed to measure a value associated with the capacitance of the one or more tracks 14. The presence of an object such as a finger or a stylus may change the amount of charge induced on the sensed track 14, and this change may be measured by controller 12 to determine the position of the object relative to touch sensor 10. The position may be a distance between the object and touch sensor 10 (e.g., a hover detection) and/or a projection of a portion of the object onto touch sensor 10 (e.g., a point on touch sensor 10 where the object is touching or hovering). Thus, in an embodiment where the surface of touch sensor 10 lies in the X-Y plane and the Z axis is orthogonal to the X-Y plane, the position may correspond to the X coordinates of the object, Y coordinates, Z coordinates, X-Y coordinates, X-Z coordinates, Y-Z coordinates, X-Y-Z coordinates, any reference position correlating with X, Y, or Z coordinates, or any other suitable position information. In certain embodiments, the same measured values may be used to determine both of the distance between the object and touch sensor 10 and the projection of a portion of the object onto touch sensor 10. Controller 12 may also factor in additional measurements and/or calculations to determine this position. For example, multiple tracks 14 may be sensed synchronously or in close succession, and the position of the object may be determined based on a calculation factoring in each of these measurements. Furthermore, certain embodiments may utilize weighted averages, linear approximation, or any suitable combination thereof to facilitate the determination of the object's position.

Certain embodiments may perform measurements using any suitable number of steps that facilitate capacitance measurements. For example, some embodiments may perform any suitable combination of pre-charging one or more tracks 14, charging one or more tracks 14, transferring charge between two or more tracks 14, discharging one or more tracks 14, and/or any other suitable step. In some embodiments, a transfer of charge may be measured directly or indirectly. For example, certain embodiments may utilize voltage measurements, current measurements, timing measurements, any other suitable measurement, or any combination thereof to measure capacitance or a change in capacitance at one or more capacitive nodes. Furthermore, certain embodiments may utilize additional circuitry (such as, for example, one or more integrators, amplifiers, capacitors, switches, audio-to-digital converters, and/or any other suitable circuitry) to perform and/or enhance such measurements. Certain embodiments may measure a value at a particular point in time, measure a change in a value over time, and/or perform any other suitable processing to facilitate the determination of an object's position relative to touch sensor 10.

Figure 2:
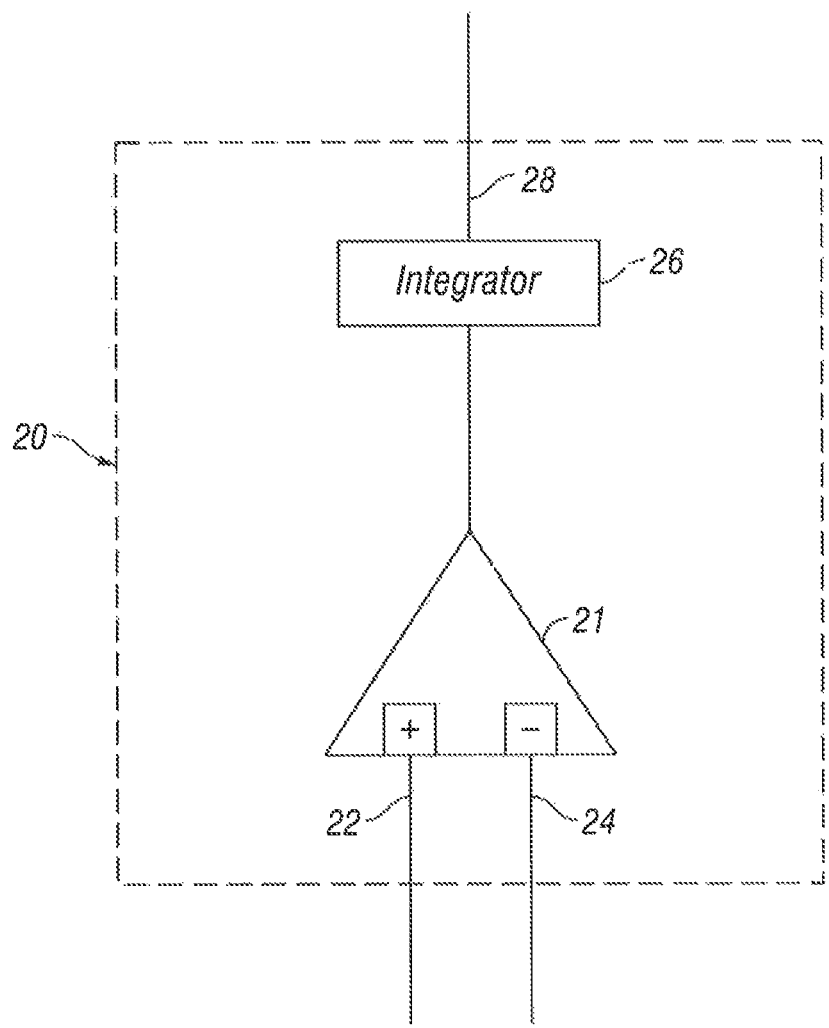
FIG. 2 illustrates example components of a differential integrator.

FIG. 2 illustrates example components that may be used in certain embodiments of differential integrator 20. In this illustrated embodiment, differential integrator 20 includes differencing circuit 21, which includes first input 22 and second input 24, and integrator 26, which includes output 28.

Chained differential sensing utilizes chains of tracks 14 and differential integrators 20 to perform differential sensing. Differential integrators 20 generate output signals proportional to the difference between their inputs, which are connected to two tracks 14. As used herein, chains refer to a series of interconnected tracks 14 and differential integrators 20 in which a first track 14 connects to the first input of a first differential integrator 20, which has a second input connected to another track 14, which is connected to the first input of another differential integrator 20. This chaining may continue until the second input of the last differential integrator 20 of the chain connects to the first track 14, effectively forming a loop. Using the output signals of differential integrators 20, controller 12 may calculate reconstructed values approximating the signals of each track 14. These reconstructed values may be calculated by setting an initial reconstructed value to a constant value, then calculating each remaining reconstructed value by subtracting the output signal of the differential integrator 20 shared by the previous track 14 and the current track 14 from the previous reconstructed value. The summing may also be performed in the other direction, such that the each remaining reconstructed value is the sum of the reconstructed value of the next track 14 and the output signal of the differential integrator 20 shared by the next track 14 and the current track 14. Controller 10 may determine the position of the object based at least on the reconstructed values.

Chaining differential integrators 20 in this manner may improve the signal-to-noise ratio of the sensed signals. Such chaining may also provide improved differential sensing in circumstances where the sensed object causes the opposite capacitive change from the expected type of change (e.g., increasing current in an affected track 14 rather than decreasing current). Furthermore, because the final reconstructed value may factor in the sum of all but one output signal, each of which may include a noise component, later-calculated reconstructed values may have more noise distortion than earlier-calculated values. Controller 12 may therefore calculate multiple sets of reconstructed values using different tracks 14 as the starting point and then average the sets, which may reduce, remove, or more evenly distribute such noise effects.

Differential integrator 20 may be one or more components operable to perform integration of the difference between input signals. Differential integrator 20 may generate an output signal based on two input signals. The output signal of differential integrator 20 may be output 28 of integrator 26. The output signal may be the result of voltage integration, current integration, or any suitable type of integration. The output of differential integrator 20 may be connected to one or more additional components of controller 12 to facilitate subsequent processing. For example, the output may be communicated to an analog-to-digital converter ("ADC"), measurement circuitry, or any other suitable component of controller 12. The inputs of differential integrator 20 may be first input 22 and second input 24 of differencing circuit 21. Differential integrator 20 may therefore be operable to generate an output signal that is proportional to a difference between the signals received at first input 22 and second input 24. As used herein, being proportional to the difference between the input signals encompasses being proportional to the difference between the inputs at a particular time or over time. Because a difference between the input signals may be the result of differential interaction of an external object (e.g., a finger or a stylus) with the associated tracks 14, the output signal may indicate a position of the object relative to the associated tracks 14.

As used herein, "signals" refer to electrical signals generated by tracks 14, differential integrator 20, or any suitable electrical component. Measuring such signals may involve measuring voltage, current, capacitance, time, or any suitable value associated with the signals. Controller 12 may also calculate values related to the directly measured value. For example, controller 12 may directly measure voltage, current, time, or other suitable values, calculate capacitance values based on the directly measured values, and then determine the position of the object using the capacitance values.

Differencing circuit 21 may be one or more components operable to output a signal proportional to the difference between input signals. Differencing circuit 21 may have first input 22 and second input 24, and the output of differencing circuit 21 may be proportional to the difference between first input 22 and second 24. In some embodiments, first input 22 may be positive input and second input 24 may be a negative input, such that the output of differencing circuit 21 is proportional to the signal received at first input 22 minus the signal received at second input 24. In some embodiments, differencing circuit 21 may multiply this difference by an amplification factor. For example, differencing circuit 21 may be a differential amplifier (e.g., an operational amplifier). In embodiments where differencing circuit 21 is an operational amplifier ("op-amp"), differential integrator 20 may be an op-amp integrator. Differencing circuit 21 may allow controller to perform differential sensing, which may reduce the effect of external noise on the measured signals.

Signals generated by components of touch sensor 10 and controller 12 may include external and/or internal noise. As used herein, external noise refers to noise effects introduced before differencing is performed by differencing circuit 21, and internal noise refers to noise effects introduced after differencing is performed by differencing circuit 21. To the extent tracks 14 connected to the inputs of differencing circuit 21 are subject to common external noise, the differencing operation may remove or reduce such external noise. However, differencing operations may not remove or reduce internal noise. Embodiments that may reduce the impact of internal noise are discussed further below with respect to FIG. 6.

Integrator 26 may be one or more components operable to perform signal integration of one or more input signals. Integrator 26 may perform voltage integration, current integration, or any suitable type of integration. The signal generated by output 28 of integrator 26 may be the output signal of differential integrator 20. Integrator 26 may allow controller 12 to measure the change in capacitance experienced by one or more tracks 14 over time, which may allow controller 12 to determine a position of an object relative to such tracks 14 following one or more sensing sequences.

Figure 3:
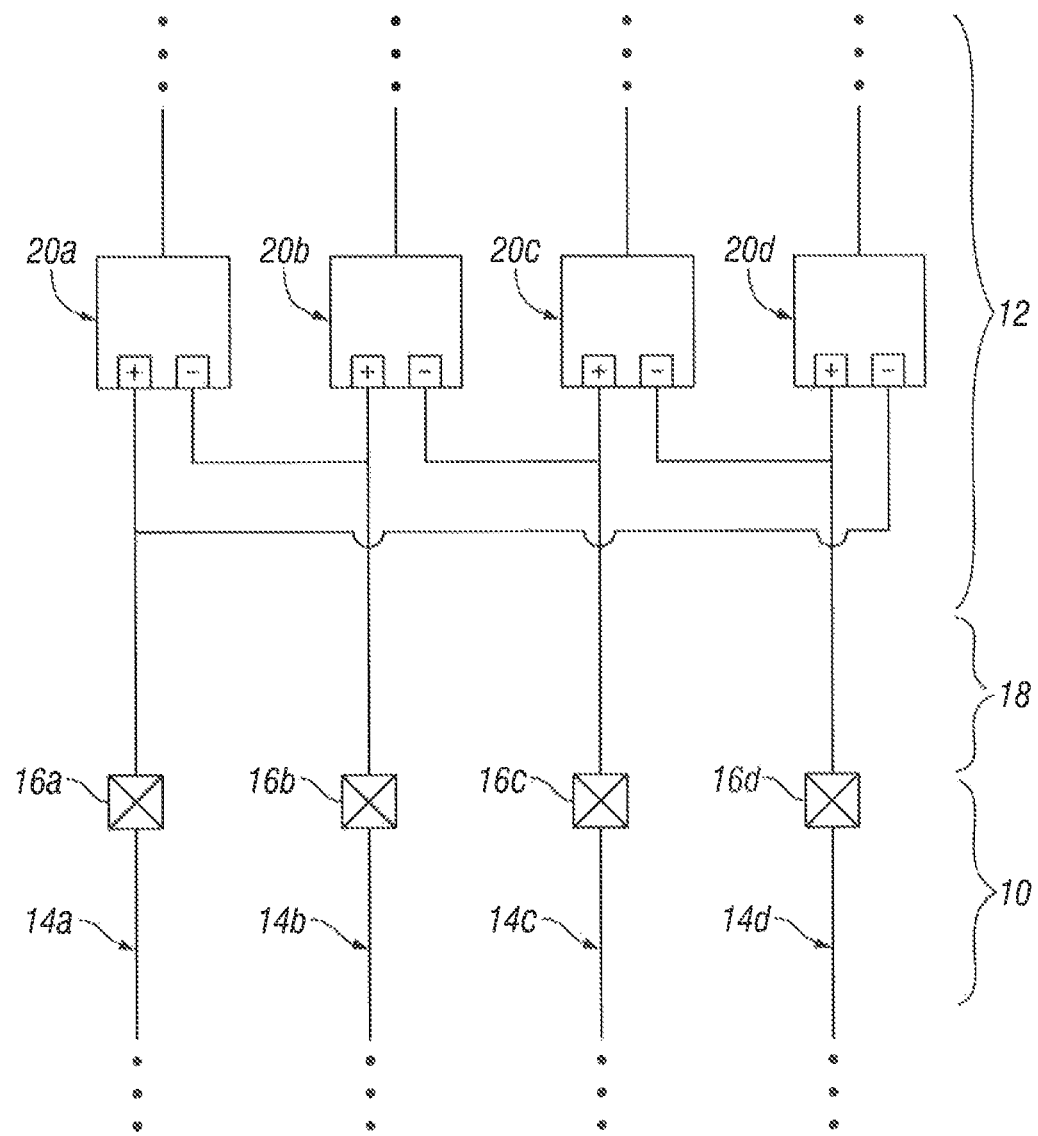
FIG. 3 illustrates an example configuration of differential integrators.

FIG. 3 illustrates an example configuration of differential integrators 20 that may be used in certain embodiments of controller 12. FIG. 3 shows portions of touch sensor 10, connection 18, and controller 12. Touch sensor 10 includes portions of tracks 14 and connection pads 16, which may have any structure, configuration, and/or function described above with respect to FIG. 1. Controller 12 includes differential integrators 20, which may have any structure, configuration, and/or function described above with respect to FIG. 2.

During operation, a voltage may be applied to one or more tracks 14, causing current to travel along track 14. The presence of certain external objects, such as a finger or a stylus, near tracks 14 may lead to capacitive coupling between the object tracks 14, which may affect the amount of current flowing through tracks 14. Different tracks 14 may be driven at the same time or at different times. When touch sensor 10 is not in contact with or near the conductive object, the same or similar currents may flow through tracks 14. However, when the object is closer to one track than the other, the tracks may experience asymmetric capacitive coupling with the object, which may result in different currents flowing through tracks 14. Thus, different signals on tracks 14 may indicate the location of the object.

Each track 14 may be connected to a positive input of one differential integrator 20 and a negative input of another differential integrator 20. Accordingly, each differential integrator 20 may be connected to one track 14 at its positive input and another track 14 at its negative input. As depicted, differential integrator 20*a* is connected to tracks 14*a* and 14*b* at its positive and negative inputs, respectively. Differential integrator 20*b* is connected to tracks 14*b* and 14*c* at its positive and negative inputs, respectively. Differential integrator 20*c* is connected to tracks 14*c* and 14*d* at its positive and negative inputs, respectively. Differential integrator 20*d* is connected to tracks 14*d* and 14*a* at its positive and negative inputs, respectively. Thus, the differential integrators 20 may be chained such that each track 14 is connected to the negative input of differential integrator 20 whose positive input is connected to a previous track 14, and each track 14 is also connected to the positive input of a differential integrator 20 whose negative input is connected to a next track 14. This chaining continues until the last differential integrator 20 of the chain is connected to the last track 14 of the chain at its positive input and the first track 14 of the chain at its negative input. Tracks 14 may be chained in any suitable order. Controller 12 may have any suitable type, number, and/or configuration of differential integrators 12.

Controller 12 may use the output signals of differential integrators 20 to calculate a plurality of reconstructed values. Each reconstructed value is associated with a particular track 14. The signals generated by tracks 14 may have a particular signal shape indicating the location of a touch. For example, a peak centered on or near a particular track 14 may indicate a touch at or near that particular track 14. Controller 12 may calculate a reconstructed value for each track 14 based on the output signals of differential integrators 20, and these reconstructed values may approximate the signals generated by tracks 14. In some embodiments, the reconstructed values may approximate the relative values of the signals generated by tracks 14. For example, each signal generated by tracks 14 may include a certain baseline signal that is common to all tracks 14. Because the reconstructed values are based on difference between the signals of tracks 14, differential sensing may remove this baseline, providing the signal shape of the original signals but not the absolute values. Thus, approximating the signals of tracks 14 may involve calculating reconstructed values that have approximately the same signal shape as the original signals despite having different absolute values. Example techniques for calculating the respective values are discussed below with respect to FIGS. 6 and 7.

Chaining differential integrators 20 in this manner may provide certain technical advantages over conventional sensing techniques. For example, chained differential sensing may improve the signal-to-noise ratio of touch sensor measurements by reducing or eliminating external noise that is common to both inputs of differencing circuit 21. Chained differential sensing may also mitigate certain deficiencies of conventional differential sensing techniques. For example, since differential sensing involves detecting touches based on differences between touch sensor signals, certain differential sensing techniques may have difficulty detecting the position of an object that affects the inputs of a differential circuit equally. Certain embodiments may mitigate such effects by detecting the position of the object based on reconstructed values for each electrode line that incorporate the outputs of multiple differential integrators 20. Certain embodiments may also mitigate "anti-touch" effects that may occur when an object has the opposite of the expected effect on the sensed signal, and an actual touch is incorrectly interpreted as a negative touch.

The inputs of differential integrators 20 may be statically or dynamically connected to tracks 14. Dynamic connections between differential integrators 20 and may be accomplished by opening or closing one or more switches (not shown). Such switches may use any appropriate form of mechanical and/or electrical switching. For example, switches may be transistor devices such as, for example, field effect transistors (FETS). In some embodiments, switches may be implemented using metal-oxide-semiconductor FETS (MOSFETS), such as NMOS or PMOS transistors. Furthermore, switches may be controlled via one or more control signals transmitted from controller 12. Controller 12 may include any number and configuration of switches, which may allow controller 12 to connect any track 14 to any input of any differential integrator 20. For ease of illustration, the connections of tracks 14 to differential integrators 20 are depicted without showing any switches or other intervening circuitry.

Differential integrators 20 and tracks 14 may be chained in any suitable order. For example, track 14*a* may have track 14*b* as its "next" track and track 14*d* as its "previous" track, as depicted in FIG. 3. However, in an alternative embodiment, track 14*a* may have track 14*d* as its "next" track and track 14*c* as its "previous" track. Furthermore, a single embodiment may switch between such configurations based on various factors. For example, different configurations of chained differential integrators 20 may be cycled sequentially, triggered by one or more factors (e.g., a measurement of a previous sensing sequence), and/or selected by other criteria.

Figure 4A:
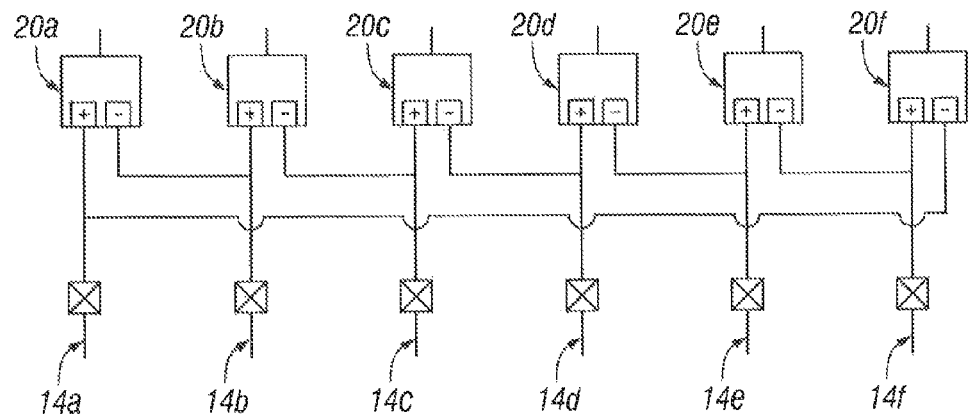
FIG. 4A illustrate an example configuration of differential integrators.
Figure 4B:
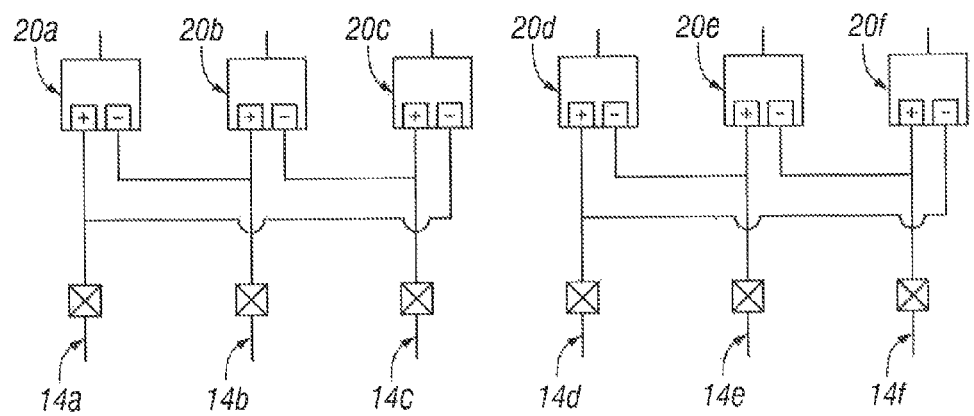
FIG. 4B illustrates an example configuration of differential integrators.
Figure 4C:
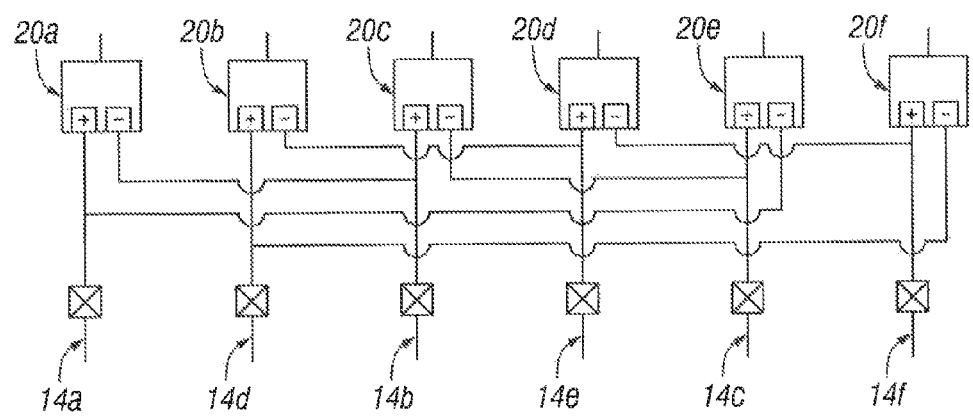
FIG. 4C illustrates an example configuration of differential integrators.

FIGS. 4A-C illustrate example configurations of differential integrators 20 that may be used in certain embodiments. The interconnections of tracks 14 and differential integrators 20 shown in FIGS. 4A-C may be configured using one or more switches, as described above, or using any suitable mechanism.

FIG. 4A illustrates an example configuration of differential integrators 20 in which differential integrators 20 are connected in a single chain. The configuration of differential integrators 20 shown in FIG. 4A is analogous to the configuration shown in FIG. 3. Tracks 14a-f are connected to differential integrators 20a-f such that tracks 14a-f and differential integrators 20a-f form a single chain. In certain embodiments, the reconstructed values for tracks 14 of a chain may be calculated by summing one or more output signals of differential integrators 20 of the chain. In such embodiments, the internal noise may be proportional to the square root of the number of noise sources, which may be the number of differential integrators 20 in the chain minus one. Furthermore, certain embodiments may calculate multiple sets of reconstructed values and then calculate an average reconstructed value for each track 14, as described further below with respect to FIG. 6. Thus, reducing the number of differential integrators 20 per chain may reduce the operational complexity of calculating the reconstructed values.

FIG. 4B illustrates an example configuration of differential integrators 20 in which differential integrators 20 are connected in two distinct chains. Tracks 14a-c are connected to differential integrators 20a-c to form a first chain, and tracks 14d-f are connected to differential integrators 20d-f to form a second chain. Thus, differential integrators 20 may be blocked such that touch sensor 10 contains multiple chains, each chain including a group of adjacent tracks 14. Since the internal noise included in the reconstructed values may be proportional to the square root of the number of differential integrators 20, blocking the chains in this manner may reduce the internal noise present in the reconstructed values. Furthermore, configuring chains in this manner may reduce the operational complexity of calculating the reconstructed values.

FIG. 4C illustrates an example configuration of differential integrators 20 in which differential integrators 20 are connected in two interleaved chains. Similar to FIG. 4B, the components of FIG. 4C are broken into separate chains. However, in the embodiment shown in FIG. 4C, tracks 14 of the first chain are interleaved with tracks 14 of the second chain. Thus, one or more tracks 14 of a particular chain may not be adjacent. As in FIG. 4B, using multiple chains may reduce the internal noise present in the reconstructed values and/or reduce the operational complexity of calculating the reconstructed values. Other embodiments may use any suitable configuration of chains. For example, some tracks 14 of a chain may be adjacent while other tracks 14 of the chain may be interleaved with tracks 14 of another chain. Furthermore, while the embodiments of FIGS. 4A-C show one or two chains, any suitable number of chains may be used.

Figure 5:
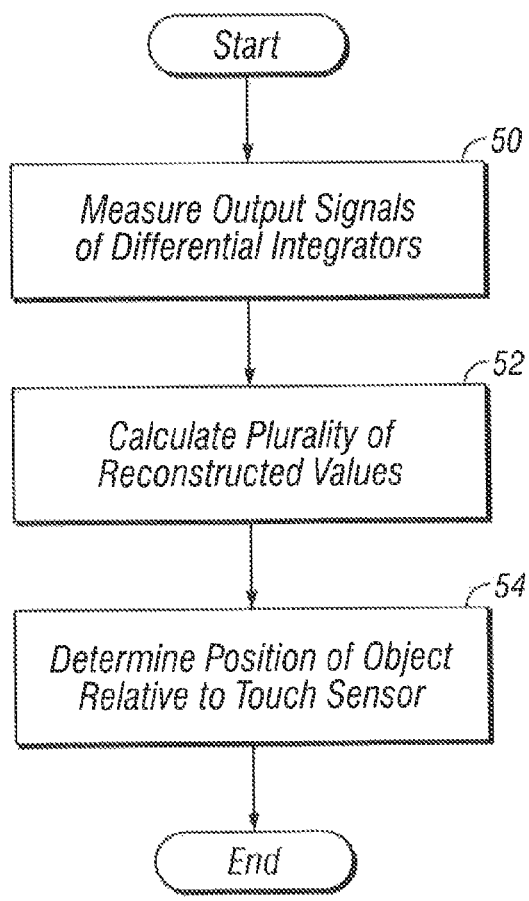
FIG. 5 illustrates an example method of operating a touch sensor.

FIG. 5 illustrates an example method of operating a touch sensor that may be used in certain embodiments.

At step 50, controller 12 measures output signals of differential integrators 20. For example, in the embodiment shown in FIG. 3, which includes four differential integrators, controller 12 may measure four output signals, one from each differential integrator 20. These output signals may be measured at the same time or separately. As described above, an output signal may be proportional to the difference between the signals received at the inputs of differential integrator 20. For example, if the signal on track 14a is 104 and the signal on track 14b is 110, the output signal of differential integrator 14a may be −6.

At step 52, controller 12 calculates a plurality of reconstructed values. Each reconstructed value may be associated with a particular track 14. For example, a reconstructed value may be an approximation of the signal generated by the respective track 14 during the sensing sequence. As described above, the reconstructed values may approximate the shape of the signals on tracks 14 such that the difference between two reconstructed values approximates the difference between their respective tracks 14. For example, in certain embodiments, if tracks 14a and 14b have signals 104 and 110, respectively, their reconstructed values may be 104 and 110, respectively, 4 and 10, respectively, −3 and 3, respectively, or any suitable values preserving the approximated signal shape. Certain embodiments may calculate the plurality of reconstructed values using the steps shown in FIG. 6.

At step 54, controller 12 determines the position of an object, such as a finger or a stylus, relative to touch sensor 10. This determination may be based on the plurality of reconstructed values. For example, since the shape of the signals on tracks 14 may be indicative of the object's position, and the reconstructed values may approximate the shape of those signals, the reconstructed values may be used as a proxy for the signals of tracks 14 to determine the position of the object. Controller 12 may also utilize additional values, algorithms, and/or other calculations to facilitate the determination of the object's position.

Figure 6:
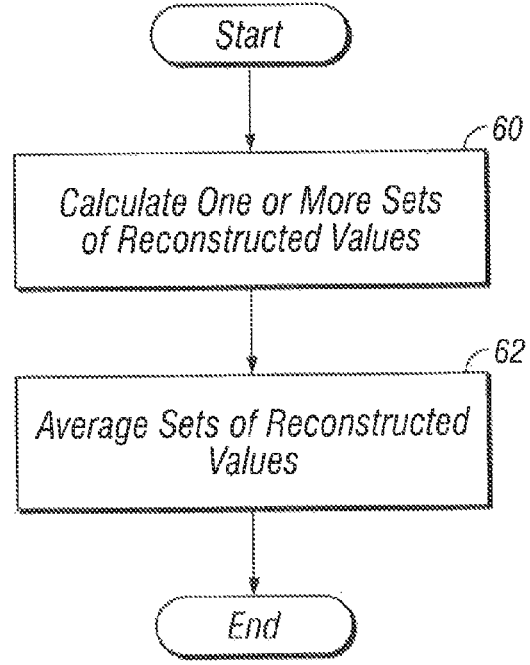
FIG. 6 illustrates an example method of calculating a plurality of reconstructed values.

FIG. 6 illustrates an example method of calculating a plurality of reconstructed values that may be used in certain embodiments. The steps shown in FIG. 6 may implement step 52 of FIG. 5.

At step 60, controller 12 calculates one or more sets of reconstructed values. Each set of reconstructed values may include a reconstructed value for each track 14 of a chain. Some embodiments may calculate multiple sets of reconstructed values. For example, a set of reconstructed values may be calculated by picking one track 14 as a starting point and then calculating the remaining reconstructed values of the chain successively. In other embodiments, a set of reconstructed values may be calculated by summing halfway through the chain in one direction, then summing halfway through the chain in the other direction. Halving the chain in this manner may reduce internal noise distortion because, as explained further below with respect to FIG. 7, calculating reconstructed values for larger chains may introduce more internal noise. Embodiments utilizing bidirectional calculations in this manner may use additional calculations to approximate the baseline signal common to each track 14 since the average of half the reconstructed values of the chain may not accurately indicate the baseline signal. Additional sets of reconstructed values may also be calculated using different tracks 14 of the chain as a starting point, which may reduce, remove, or more evenly distribute internal noise effects. A set of reconstructed values may be calculated using the steps shown in FIG. 7.

In some embodiments, after calculating reconstructed values for each track 14 of a chain, controller 12 may subtract the mean reconstructed value from each reconstructed value. For example, if the reconstructed values for tracks 14a-d are 100, 110, 120, and 110, respectively, the mean value is 110. Thus, following subtraction of the average, the reconstructed values may be −10, 0, 10, and 0. Subtracting the mean value from the reconstructed values may remove a baseline signal to which each track 14 is subjected. For example, where a baseline DC level is applied to each track 14, subtracting the mean value of the set of reconstructed vales may remove this DC level.

At step 62, the one or more sets of reconstructed values calculated in step 60 are averaged. As explained above, each set may include a reconstructed value for each track 14 of the chain. Averaging the sets involves, for each track 14, averaging all reconstructed values for that track 14, resulting in a set of averaged reconstructed values, each averaged reconstructed value being the average of the reconstructed values for a particular track 14 from the one or more sets. Averaging the reconstructed values in this manner may reduce, remove, or more evenly distribute internal noise effects.

Controller 12 may calculate any appropriate number of sets of reconstructed values. For example, some embodiments may calculate a single set of reconstructed values, while other embodiments may calculate N sets of reconstructed values, where N is the number of the differential integrators 20 in the chain. N sets may be calculated where a single set of reconstructed values is calculated using each track 14 of the chain as the starting point for the calculations. Furthermore, since the reconstructed values may be calculated moving in either direction along the chain, each starting point may yield two sets of reconstructed values, resulting in 2N possible sets.

Some embodiments may calculate multiple sets without using each track 14 as a starting point. For example, in some embodiments, controller 12 calculates two sets of reconstructed values, the first set using a first track 14 as the starting point, the second set using a second track 14 as the starting point, where the second track 14 is approximately halfway through the chain from the first track 14. Fewer sets of reconstructed values may reduce the mitigation of internal noise effects. However, calculating fewer sets of reconstructed values may also reduce the operational complexity of the sensing calculations. For example, in an embodiment with N differential integrators 20, each set involves calculating N reconstructed values, and calculating multiple sets using each track 14 as a starting point may yield N or 2N sets. Thus, controller 12 may calculate $N^2$ or $2N^2$ reconstructed values, which has an operational complexity of $O(N^2)$. Calculating some but not all of the possible sets of reconstructed values may therefore provide a compromise between improved internal noise resistance and increased operational complexity.

Figure 7:
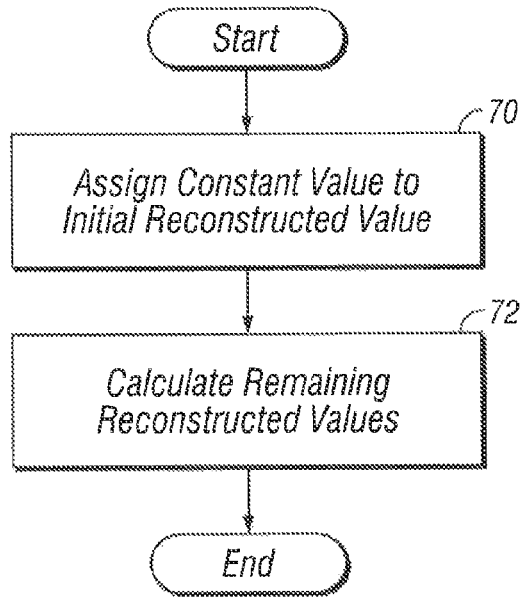
FIG. 7 illustrates an example method of calculating a set of reconstructed values.

FIG. 7 illustrates an example method of calculating a set of reconstructed values that may be used in certain embodiments. The steps shown in FIG. 7 may implement portions of step 60 of FIG. 6.

At step 70, controller 12 assigns a constant value to an initial reconstructed value. The initial reconstructed value may be associated with any track 14 of the chain. In embodiments where multiple sets of reconstructed values are calculated, the initial reconstructed for a particular set may be chosen based on various criteria. For example, if N sets are calculated, a set using each track 14 as a starting point, controller 12 may cycle through the possible initial reconstructed values as it calculates the sets. As another example, if two sets are calculated, controller 12 may start with any track 14 for the first set, then use a track 14 approximately halfway through the chain as the starting point for the next set. As a specific example, if a chain includes eight tracks 14 connected consecutively, Y1 through Y8, which have reconstructed values R1 through R8, respectively, R1 may be used as the initial reconstructed value for the first set, and R5 may be used as the initial reconstructed value of the second set. The constant value, which may be represented as C, may be any suitable constant value. For example, C may be 0, 100, or any suitable constant value. Setting the initial reconstructed value to C may provide a baseline assumption from which the remaining calculated can be based.

At step 72, controller 12 calculates the remaining reconstructed values of the set. Each remaining value may be calculated based on the known differential operation of differential integrators 20. For example, using the embodiment shown in FIG. 3, tracks 14*a-d* may have signals Y1 through Y4, respectively, and differential integrators 20*a-d* may have output signals I1 through I4, respectively. Given the illustrated chaining of tracks 14 and differential integrators 20 in FIG. 3, the output signals may have the following values:

$I1 = Y1 - Y2$ $I2 = Y2 - Y3$ $I3 = Y3 - Y4$ $I4 = Y4 - Y1$

Based on these equations, the signals of tracks 14 may be represented the following sets of equations:

| | |
|---|---|
| Y1 = Y4 − I4 | Y1 = Y2 + I1 |
| Y2 = Y1 − I1 | Y2 = Y3 + I2 |
| Y3 = Y2 − I2 | Y3 = Y4 + I3 |
| Y4 = Y3 − I3 | Y4 = Y1 + I4 |

Reconstructed value for tracks 14*a-d* may be represented by R1 through R4, respectively. Given the relationship between the Y and I values shown above, the reconstructed values may be approximated using analogous equations:

| | |
|---|---|
| R1 = R4 − I4 | R1 = R2 + I1 |
| R2 = R1 − I1 | R2 = R3 + I2 |
| R3 = R2 − I2 | R3 = R4 + I3 |
| R4 = R3 − I3 | R4 = R1 + I4 |

Thus, the reconstructed value for any track 14 may be approximated by the reconstructed value of the previous track 14 minus the output signal of the differential integrator whose second input (or negative input) is connected to track 14. The reconstructed value for any track 14 may also be approximated by the reconstructed value of the next track 14 plus the output signal of the differential integrator whose first input (or positive input) is connected to track 14.

As explained above with respect with respect to step 70, an initial reconstructed value may be set to C. Once the initial reconstructed value is set, the above relationships may be used to calculate the remaining reconstructed values in each direction along the chain. For example, if R1 is set to C, the remaining reconstructed values may calculated summing from left to right (shown in the left column) and/or right to left (shown in the right column) as follows:

| | |
|---|---|
| R1 = C | R1 = C |
| R2 = R1 − I1 = C − I1 | R4 = R1 + I4 = C + I4 |
| R3 = R2 − I2 = C − I1 − I2 | R3 = R4 + I3 = C + I4 + I3 |
| R4 = R3 − I3 = C − I1 − I2 − I3 | R2 = R3 + I2 = C + I4 + I3 + I2 |

These reconstructed values may have approximately the same signal shape as the signals of tracks 14. Furthermore, as explained above, later-calculated reconstructed values in the chain may include greater amounts of internal noise. This can be seen in the above equations since R2=C+I4+I3+I2 includes three components (inherent in I4, I3, and I2), while R1=C includes none. Averaging multiple sets of reconstructed values that use different tracks 14 as the starting point may reduce, remove, or more evenly distribute internal noise effects, which may improve the accuracy of the reconstructed signals. For example, taking the average of 2N sets as described above with respect to FIG. 6 may provide an equal number of positive and negative noise contributions, which may cancel a common-mode component of the internal noise. When using fewer sets of reconstructed values, the positive and negative noise contributions may not cancel out, which may cause a common-mode component in the internal noise to affect the slope or shape of the reconstructed values. However, such distortion may be mitigated by subtracting an adjustment value from the reconstructed values. The adjustment value may be the sum of the output signals of differential integrators 20 multiplied by the net number of noise contributions (assuming that each output signal added when calculating a reconstructed value adds a noise contribution and that each output signal subtracted removes a noise contribution), divided by the number of differential integrators 20 in the chain.

Figure 8:
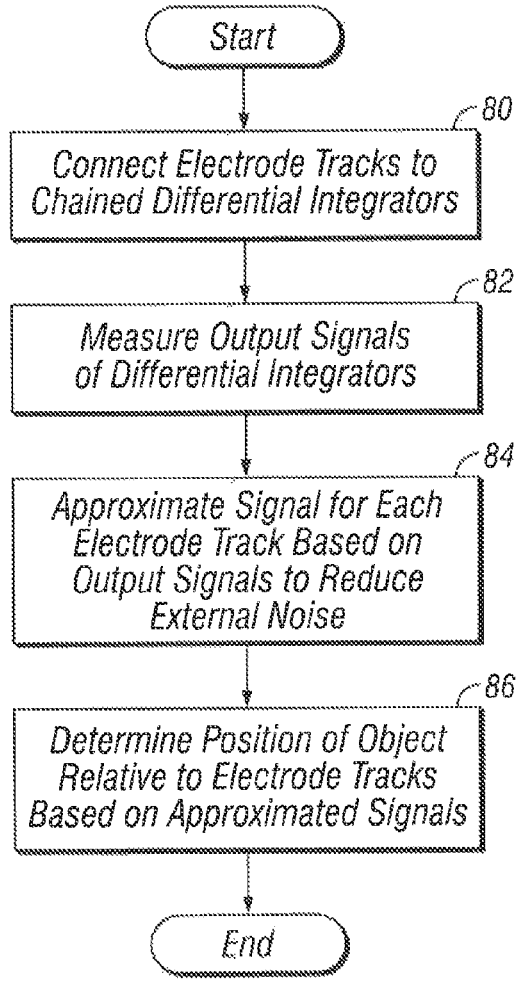
FIG. 8 illustrates an example method of reducing external noise using chained differential sensing.

FIG. 8 illustrates an example method of reducing external noise using chained differential sensing that may be used in certain embodiments.

At step 80, tracks 14 are electrically connected to differential integrators 20 to form one or more chains. The interconnections of tracks 14 and differential integrators 20 may be configured using one or more switches, as described above, or using any suitable mechanism. This connection may be controlled by one or more input signals from controller 12, which may configure the connections based on various factors. For example, controller 12 may cycle through multiple configurations, select a particular configuration based on various criteria (e.g., the position of the object detected during the previous sensing sequence), utilize a single, static configuration, or use any suitable criteria for selecting a particular configuration of interconnections between tracks 14 and differential integrators 20.

At step 82, controller 12 measures the output signals of signals of differential integrators 20. Controller 12 may use any suitable component and/or operation to measure the output signals, such as the components and operations described above with respect to FIG. 1 or step 50 of FIG. 5.

At step 84, controller 12 approximates a signal for each track 14. The approximated signals may be the reconstructed values described above. The approximated signals may have approximately the same signal shape as the signals generated by tracks 14 during the sensing sequence. The differential sensing may remove any external noise that is common to tracks 14. Chaining the differential integrators as described above may also mitigate anti-touch effects. While the approximated signals may include internal noise, such noise may be more evenly distributed by averaging multiple sets of approximated signals as described above with respect to FIGS. 6 and 7.

At step 86, controller 12 determines a position of an external object relative to tracks 14 based at least on the approximated signals. Controller 12 may also utilize other measurements, algorithms, or any suitable factor to facilitate detection of the object's position. Controller 12 may use the shape of the approximated signals to determine the position of the object, since, as explained above, the shape of the approximated signals may be the same as or similar to the shape of the underlying signals on tracks 14.

Particular embodiments may repeat the steps of FIGS. 5-8, where appropriate. For example, one or more of the steps of FIG. 5 may be repeated to provide additional measurements that may be used to determine the position of an object. As another example, the steps of FIG. 5 may be performed successively to provide a determination of the position of the object over time. As another example, some embodiments may repeat the steps of FIG. 7 during a single sensing sequence to calculate one or more sets of reconstructed values using different tracks 14 as the initial reconstructed value. As yet another example, certain embodiments may omit the steps of FIG. 6 or 7 entirely. In some embodiments, these steps are carried out using one or more components of FIGS. 1, 2, 3, and 4A-C. Furthermore, although this disclosure describes and illustrates particular components, devices, or systems carrying out particular steps in FIGS. 5-8, this disclosure contemplates any suitable combination of any suitable components, devices, or systems carrying out any suitable steps in FIGS. 5-8.

Herein, reference to a computer-readable non-transitory storage medium or media may include one or more semiconductor-based or other integrated circuits (ICs) (such, as for example, a field-programmable gate array (FPGA) or an application-specific IC (ASIC)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards, SECURE DIGITAL drives, any other suitable computer-readable non-transitory storage medium or media, or any suitable combination of two or more of these, in particular embodiments. A computer-readable non-transitory storage medium or media may be volatile, non-volatile, or a combination of volatile and non-volatile, in particular embodiments.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. For example, in some embodiments, the components depicted in FIG. 2 may form a portion of and/or may be integrated into controller 12. Alternatively or in addition, such components may form a portion of and/or may be integrated into touch sensor 10. As another example, tracks 14 may be connected to differential integrators 20 in any suitable configuration. Moreover, such configurations may be dynamic such that different sensing sequences utilize different configurations, and such configurations may be determined by any suitable factor (e.g., one or more measurements of a previous sensing sequence). In some embodiments, additional operations may be performed before or after calculating the plurality of reconstructed values to determine the position of the object. It should also be understood that the teachings of the present disclosure are applicable to a controller 12 that uses any manner of appropriate signal processing to process and/or condition signals received from touch sensor 10.

Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   measuring, by circuitry of a controller, two or more output signals, each output signal associated with one of two or more differential integrators, each differential integrator comprising:
      first and second inputs electrically connected to respective electrode tracks of a touch sensor comprising two or more electrode tracks; and
      an output configured to generate the output signal, the output signal being proportional to a difference between signals received at the first and second inputs;
      wherein the two or more differential integrators are chained such that each electrode track is associated with:
         a previous electrode track electrically connected to the first input of the differential integrator whose second input is electrically connected to the electrode track; and
         a next electrode track electrically connected to the second input of the differential integrator whose first input is electrically connected to the electrode track;
   calculating, by the circuitry, a plurality of reconstructed values comprising a first set of reconstructed values, each reconstructed value of the first set associated with a respective electrode track, at least one of the reconstructed values of the first set calculated based at least on one or more of the output signals; and
   determining, by the circuitry, a position of an object relative to the touch sensor based at least on the plurality of reconstructed values.

2. The method of claim 1, wherein each reconstructed value of the first set indicates a change in capacitance experienced by its respective electrode track.

3. The method of claim 1, wherein:
   the first set of reconstructed values comprises an initial reconstructed value and remaining reconstructed values;
   for each electrode track, the associated reconstructed value is associated with a previous reconstructed value comprising the reconstructed value of the previous electrode track;
   calculating the plurality of reconstructed values comprises:
      assigning a constant value to the initial reconstructed value; and
      calculating the remaining reconstructed values such that each remaining reconstructed value is approximately equal to the previous reconstructed value minus the output signal of the differential integrator whose second input is electrically connected to the electrode track associated with the remaining reconstructed value.

4. The method of claim 3, wherein:
   the two or more differential integrators comprise first, second, third, and final differential integrators;
   the two or more electrode tracks comprise:
      a first electrode track electrically connected to the first input of the first differential integrator and the second input of the final differential integrator;
      a second electrode track electrically connected to the second input of the first differential integrator and the first input of the second differential integrator; and
      a third electrode track electrically connected to the second input of the second differential integrator and the first input of the third differential integrator;
   the respective reconstructed value of the first electrode track is the constant value;
   the respective reconstructed value of the second electrode track is approximately the constant value minus the output signal of the first differential integrator; and
   the respective reconstructed value of the third electrode track is approximately the constant value minus the output signal of the first differential integrator, minus the output signal of the second differential integrator.

5. The method of claim 1, wherein:
   the first set of reconstructed values comprises an initial reconstructed value and remaining reconstructed values;
   for each electrode track, the respective reconstructed value is associated with a next reconstructed value comprising the reconstructed value of the next electrode track;
   calculating the first set of reconstructed values comprises:
      assigning a constant value to the initial reconstructed value; and
      calculating the remaining reconstructed values such that each remaining reconstructed value is approximately equal to the next reconstructed value plus the output signal of the differential integrator whose first input is electrically connected to the electrode track associated with the remaining reconstructed value.

6. The method of claim 5, wherein:
   the two or more differential integrators comprise first, second, third, and fourth differential integrators;
   the two or more electrode tracks comprise:
      a first electrode track electrically connected to the first input of the first differential integrator and the second input of the second differential integrator;
      a second electrode track electrically connected to the first input of the second differential integrator and the second input of the third differential integrator; and
      a third electrode track electrically connected to the first input of the third differential integrator and the second input of the fourth differential integrator;
   the reconstructed value of the first electrode track is the constant value;
   the reconstructed value of the second electrode track is approximately the constant value plus the output signal of the second differential integrator; and
   the reconstructed value of the third electrode track is approximately the constant value plus the output signal of the second differential integrator plus the output signal of the third differential integrator.

7. The method of claim 1, wherein:
   the plurality of reconstructed values comprises a plurality of sets of reconstructed values;
   calculating the plurality of reconstructed values comprises calculating each set of reconstructed values, each set of reconstructed values comprising a respective reconstructed value associated with each electrode track such that each electrode track is associated with a respective reconstructed value from each set;
   the method further comprises calculating a plurality of average reconstructed values comprising an average reconstructed value for each electrode track, the average reconstructed value being an average the respective reconstructed values from each set; and the determination of the position of the object is based at least on the plurality of average reconstructed values.

8. The method of claim 1, wherein the first and second inputs are positive and negative inputs, respectively, such that the output signal is proportional to the signal received at the first input minus the signal received at the second input.

9. The method of claim 1, wherein:

the touch sensor further comprises two or more additional electrode tracks;

the plurality of reconstructed values further comprises a first set of additional reconstructed values, each additional reconstructed value associated with a respective additional electrode track; and the method further comprises:

measuring, by the circuitry, two or more additional output signals, each additional output signal associated with one of two or more additional differential integrators, each additional differential integrator comprising:

first and second inputs electrically connected to respective electrode tracks of the two or more additional electrode tracks; and an output configured to generate the additional output signal, the additional output signal being proportional to a difference between signals received at the first and second inputs;

wherein the two or more additional differential integrators are chained such that each additional electrode track is associated with:

a previous electrode track electrically connected to the first input of the additional differential integrator whose second input is electrically connected to the additional electrode track; and a next electrode track electrically connected to the second input of the additional differential integrator whose first input is electrically connected to the additional electrode track; and calculating, by the circuitry, the first set of additional reconstructed values, at least one of the additional reconstructed values of the first set of additional reconstructed values calculated based at least on one or more of the additional output signals.

10. The method of claim 9, wherein the electrode tracks are at least partially interleaved with the additional electrode tracks.

11. The method of claim 9, wherein the electrode tracks are not interleaved with the additional electrode tracks.

12. An apparatus comprising:

a touch sensor comprising two or more electrode tracks; and a controller electrically connected to the touch sensor, the controller comprising:

two or more differential integrators, each differential integrator comprising:

first and second inputs electrically connected to respective electrode tracks of the touch sensor; and an output configured to generate the output signal, the output signal being proportional to a difference between signals received at the first and second inputs;

wherein the two or more differential integrators are chained such that each electrode track is associated with:

a previous electrode track electrically connected to the first input of the differential integrator whose second input is electrically connected to the electrode track; and a next electrode track electrically connected to the second input of the differential integrator whose first input is electrically connected to the electrode track; and circuitry configured to determine a position of an object relative to the touch sensor based at least on one or more the output signals of the differential integrators.

13. The apparatus of claim 12, wherein the circuit is further configured to:

measure the output signals of the differential integrators; and calculate a plurality of reconstructed values comprising a first set of reconstructed values, each reconstructed value of the first set associated with a respective electrode track, at least one of the reconstructed values of the first set calculated based at least on one or more of the output signals;

wherein the determination of the position of the object is based at least on the plurality of reconstructed values.

14. The apparatus of claim 12, wherein each reconstructed value of the first set indicates a change in capacitance experienced by its respective electrode track.

15. The apparatus of claim 12, wherein:

the first set of reconstructed values comprises an initial reconstructed value and remaining reconstructed values;

for each electrode track, the associated reconstructed value is associated with a previous reconstructed value comprising the reconstructed value of the previous electrode track;

calculating the plurality of reconstructed values comprises:

assigning a constant value to the initial reconstructed value; and calculating the remaining reconstructed values such that each remaining reconstructed value is approximately equal to the previous reconstructed value minus the output signal of the differential integrator whose second input is electrically connected to the electrode track associated with the remaining reconstructed value.

16. The apparatus of claim 15, wherein:

the two or more electrode tracks comprise first, second, and third electrode tracks;

the two or more differential integrators comprise:

a first differential integrator having its first input electrically connected to the first electrode track and its second input electrically connected to the second electrode track;

a second differential integrator having its first input electrically connected to the second electrode track and its second input electrically connected to the third electrode track;

a third differential integrator having its first input electrically connected to the third electrode track; and a final differential integrator having its second input electrically connected to the first electrode track; and the respective reconstructed value of the first electrode track is the constant value;

the respective reconstructed value of the second electrode track is approximately the constant value minus the output signal of the first differential integrator; and the respective reconstructed value of the third electrode track is approximately the constant value minus the output signal of the first differential integrator, minus the output signal of the second differential integrator.

17. The apparatus of claim 12, wherein:
the plurality of reconstructed values comprises a plurality of sets of reconstructed values;
calculating the plurality of reconstructed values comprises calculating each set of reconstructed values, each set of reconstructed values comprising a respective reconstructed value associated with each electrode track such that each electrode track is associated with a respective reconstructed value from each set;
the method further comprises calculating a plurality of average reconstructed values comprising an average reconstructed value for each electrode track, the average reconstructed value being an average the respective reconstructed values from each set; and
the determination of the position of the object is based at least on the plurality of average reconstructed values.

18. A non-transitory computer readable storage medium comprising logic, the logic operable, when executed by circuitry of controller electrically connected to a touch sensor comprising two or more electrode tracks, to:
measure two or more output signals, each output signal associated with one of two or more differential integrators, each differential integrator comprising:
first and second inputs electrically connected to respective electrode tracks of the touch sensor; and
an output configured to generate the output signal, the output signal being proportional to a difference between signals received at the first and second inputs;
wherein the two or more differential integrators are chained such that each electrode track is associated with:
a previous electrode track electrically connected to the first input of the differential integrator whose second input is electrically connected to the electrode track; and
a next electrode track electrically connected to the second input of the differential integrator whose first input is electrically connected to the electrode track;
calculate a plurality of reconstructed values comprising a first set of reconstructed values, each reconstructed value of the first set associated with a respective electrode track, at least one of the reconstructed values of the first set calculated based at least on one or more of the output signals; and
determine a position of an object relative to the touch sensor based at least on the plurality of reconstructed values.

19. The non-transitory computer readable storage medium of claim 18, wherein:
the first set of reconstructed values comprises an initial reconstructed value and remaining reconstructed values;
for each electrode track, the associated reconstructed value is associated with a previous reconstructed value comprising the reconstructed value of the previous electrode track;
calculating the plurality of reconstructed values comprises:
assigning a constant value to the initial reconstructed value; and
calculating the remaining reconstructed values such that each remaining reconstructed value is approximately equal to the previous reconstructed value minus the output signal of the differential integrator whose second input is electrically connected to the electrode track associated with the remaining reconstructed value.

20. The non-transitory computer readable storage medium of claim 19, wherein:
the two or more differential integrators comprise first, second, third, and final differential integrators;
the two or more electrode tracks comprise:
a first electrode track electrically connected to the first input of the first differential integrator and the second input of the final differential integrator;
a second electrode track electrically connected to the second input of the first differential integrator and the first input of the second differential integrator; and
a third electrode track electrically connected to the second input of the second differential integrator and the first input of the third differential integrator;
the respective reconstructed value of the first electrode track is the constant value;
the respective reconstructed value of the second electrode track is approximately the constant value minus the output signal of the first differential integrator; and
the respective reconstructed value of the third electrode track is approximately the constant value minus the output signal of the first differential integrator, minus the output signal of the second differential integrator.

* * * * *